Figures 1, 3, 4:
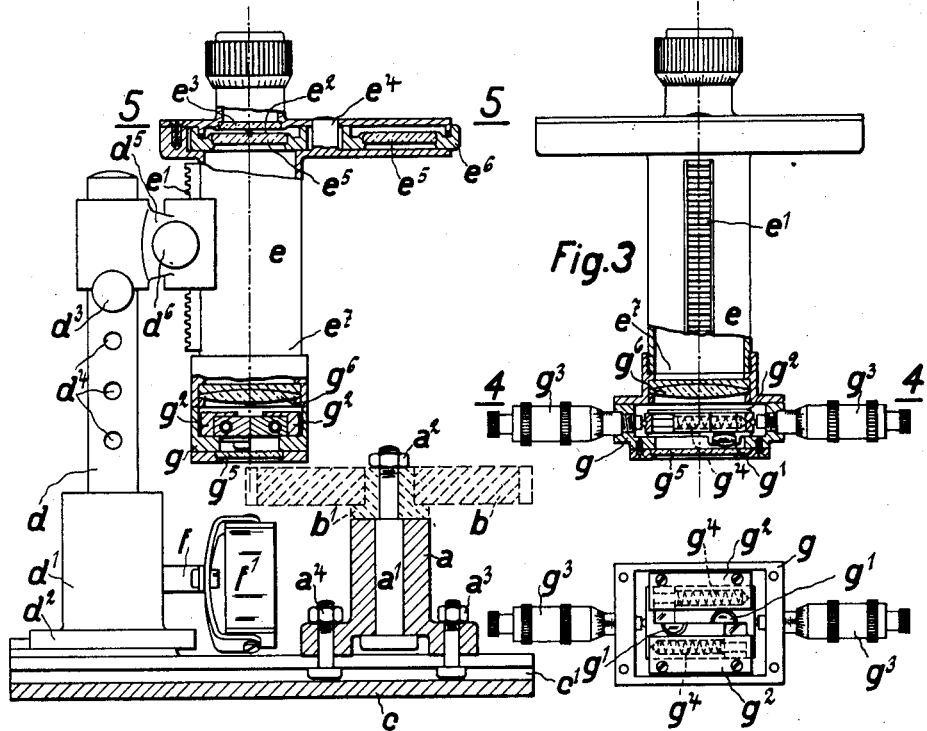

Sept. 13, 1927. 1,642,219

A. STEINLE ET AL

APPARATUS FOR TESTING TOOTHED WHEELS

Filed Jan. 4, 1924     4 Sheets-Sheet 1

Inventors:
Adolf Steinle
Otto Eppenstein

Inventors:
Adolf Steinle
Otto Eppenstein

Patented Sept. 13, 1927.

1,642,219

UNITED STATES PATENT OFFICE.

ADOLF STEINLE AND OTTO EPPENSTEIN, OF JENA, GERMANY, ASSIGNOR TO THE FIRM OF CARL ZEISS, OF JENA, GERMANY.

APPARATUS FOR TESTING TOOTHED WHEELS.

Application filed January 4, 1924, Serial No. 684,365, and in Germany January 4, 1923.

The present invention relates to an apparatus which serves for testing the accuracy of toothed wheels. The invention avails itself of the well-known idea of determining the distance of two points by optically bringing into coincidence the image of these two points by means of a suitable observation microscope, whereby the value sought for will be furnished by the amount of the relative displacement of the optical members which is necessary for attaining the coincidence of the two images. In this case the above idea is used in such a way that the apparatus is provided with a double-image microscope which produces two images of adjacent flanks, i. e. of both flanks of one tooth or of two adjacent flanks of adjacent teeth, one flank only being shown in each image, which images overlap each other in the field of view. If two adjacent flanks, having a different direction, be observed parallel to the producing line of the flanks the images of the two flanks intersect in the image field of the microscope. As generally the flanks do not differ very much from the radial direction, the position of the point of intersection of the two images is greatly affected in the radial direction by the distance which the two flanks have from each other in the tangential direction. In particular, if the toothed wheel to be tested be illuminated from behind, there results in the field of view at the point, in which both parts of the tooth observed simultaneously cut off the light, a particularly dark area, ending in a point, whose radial dimension is especially characteristic.

By gradually rotating the toothed wheel to be tested about its axis through the angle of division the aberrations of the point of intersection of the flanks, imaged at any one time, from its correct position indicate the errors of the flanks. In order to measure these errors it is possible to provide the microscope with a device which admits of displacing the two images relatively to each other and of reading off the amount of this displacement on scales. It will then be possible to ascertain the displacement which is requisite for bringing the point of intersection of the images of the flanks to the point of the image field, which would correspond to a wheel free from errors. If, however, it be only desired to ascertain whether the errors of the toothing do not exceed certain definite limits, it is sufficient to provide in the image field of the microscope fixed or adjustable marks which delimit the field of play within which the point of intersection must lie.

Experience has proved that wrought flanks of teeth are not continuous unbroken curves but that there are in most cases aberrations or departures from the continuous course of the curves which, especially with higher microscopic magnification, can be clearly recognized as excavations of the flank-curve. Owing to the existence of these excavations the position of the point of intersection of the flank-images becomes uncertain and thereby the accuracy of reading of the apparatus impaired. The apparatus may therefore be improved by fitting in the image field of the microscope fixed or adjustable marks which surround that particularly dark area, simultaneously shaded by the two parts of the tooth observed.

If it be desired to measure errors in the position of the teeth (oblique position relatively to their radial position), it is advisable to provide the microscope, in addition to a fixed rectilinear mark, with a rotatable number of rectilinear marks which partly project into the image field, whereby the linear marks are in contact with concentric circles about the centre of rotation. With a view to obtaining a simplified testing apparatus suited for all possible cases and in order not to be obliged, when testing a wheel and measuring the different errors arising, to use several similar apparatus fitted with different divided plates, it is possible to unite the rotatable linear marks on a rotatable plate. Of course, it does not alter the nature of the matter whether in this case each number of linear marks are distributed over the whole periphery of this plate so that the numbers overlap each other, or whether the linear marks, in order to avoid errors of reading off, are so disposed on the plate that only one of the numbers projects into the image field at any one time.

By constructing the new apparatus in the manner hitherto described, i. e. so as to use the relative position of the two images of two flanks of a tooth, having a different direction, for judging the accuracy of the toothing, this involves the drawback that with the examination of the division in the pitch circle and in optional circles, intersecting the toothing, about the centre of the wheel each such examination is composed of several single examinations, viz, of an examination each of the dimension of a tooth space and of a tooth. This is due to the fact that on the one hand the adjacent flanks, having a different direction, of a space and on the other hand the adjacent flanks, having a different direction, of a tooth form the subject of the microscopic observation. This drawback can be avoided by constructing the microscope in such a way that the rays, imaging the one of the flanks, undergo one more reflection than those rays imaging the other flank. With such a construction the images of the two flanks intersect in the image field of the microscope when both flanks observed have the same direction. By illuminating the toothed wheel to be tested from behind, there again results in the image field at the point, in which both parts of the tooth observed simultaneously cut off the light, that particularly characteristic, dark area ending in a point. The distance between two adjacent flanks, having the same direction, measured on an optional circle, about the centre of the wheel, is however equivalent to the division in this circle, i. e. to that magnitude to which the test is to relate.

Figure 2:
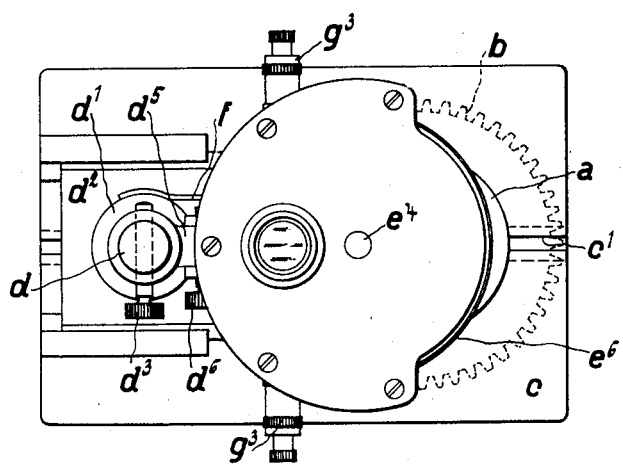
Figure 5:
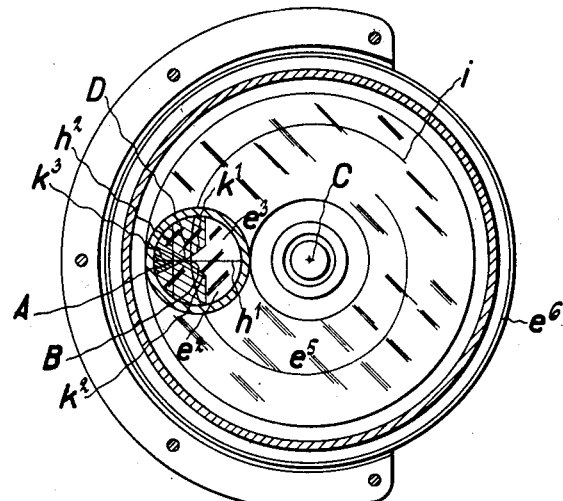
Figure 6:
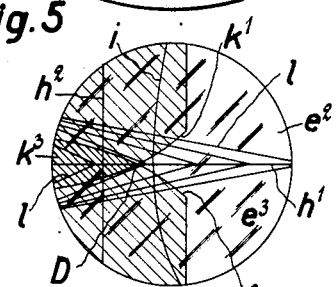
Figure 7:
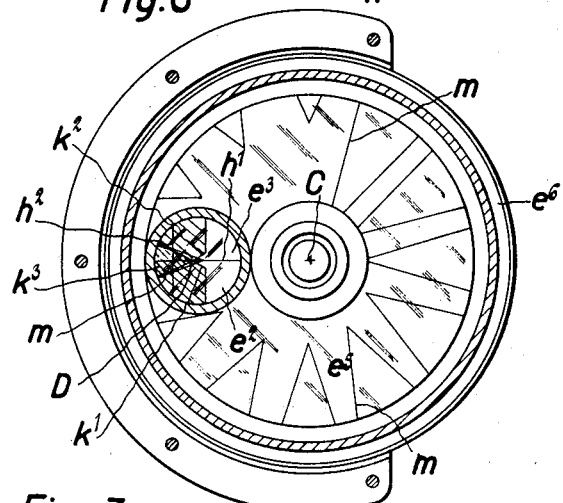
Figure 8:
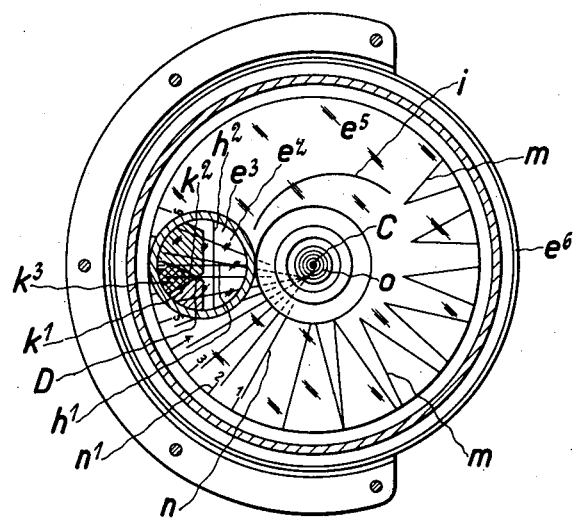
Figure 11:
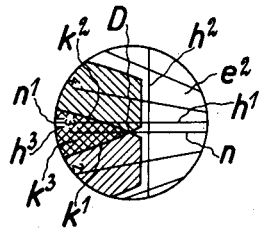
Figure 12:
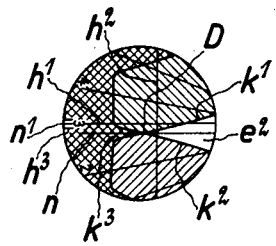
Figure 13:
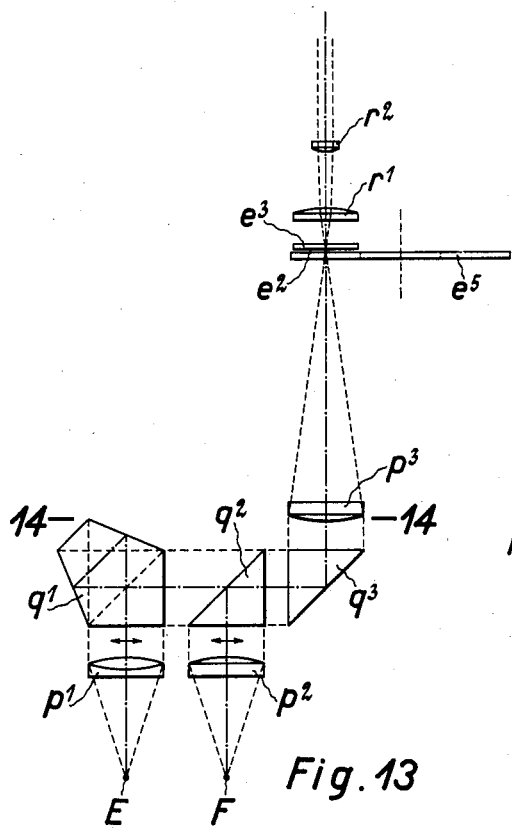
Figure 14:
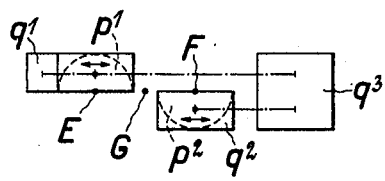
Figure 15:
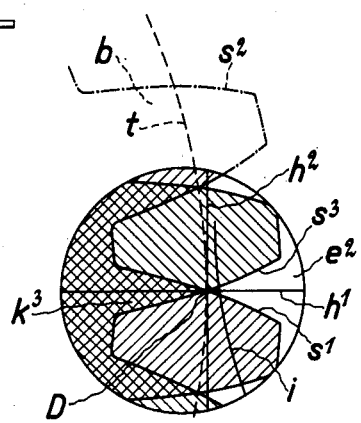
Figure 16:
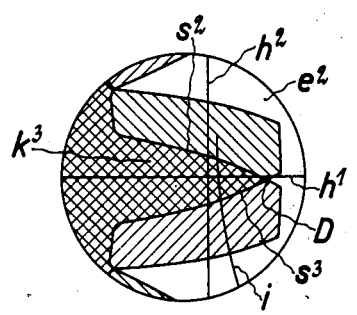

In the annexed drawing Figs. 1 to 5 show a constructional example of the subject of the invention. Figs. 1 and 2 illustrate, partly in section, the constructional example in elevation and in plan respectively, Fig. 3 is, also partly in section, a side elevation of the observation microscope, Fig. 4 is a section through the microscope on the line 4—4 of Fig. 3, Fig. 5 is a section on a larger scale on the line 5—5 of Fig. 1. Figs. 6 and 7 show on a larger scale a modification each of the first example. Fig. 8 shows a further modification of the first example, whilst Figs. 9 to 12 represent on a larger scale the image field of the microscope with different adjustments of the divided plates and the object, which characterize the measuring process. In Figs. 13 to 16 is shown a second constructional example. Fig. 13 is an elevation, Fig. 14 is a section on the line 14—14 of Fig. 13, Figs. 15 and 16 show on a larger scale the image field of the microscope with particularly characteristic adjustments of a toothed wheel to be tested.

In the example shown in Figs. 1 to 5 a screw bolt $a^1$, rotatably supported in a toothed wheel carrier $a$, is provided with a nut $a^2$ which is destined to hold fast for testing purposes a toothed wheel $b$ fitted with a bush $b^1$. Two bolt screws $a^3$ and $a^4$ serve for fixing the toothed wheel carrier $a$ on a base plate $c$, at an optional place of a T-groove $c^1$. On the base plate $c$ there is at the same time displaceably disposed parallel to the T-groove $c^1$ a microscope carrier $d$ with a carriage guide $d^2$, fitted to its foot $d^1$, which carries a double image-microscope $e$ on an arm $d^5$ which can be coarsely adjusted in elevation by means of a pin $d^3$ and several appertaining boreholes $d^4$. The fine adjustment of the microscope is effected by means of a rack $e^1$ and a pinion $d^6$. A mirror $f^1$, which is rotatable about two axes perpendicular to each other on a mirror carrier $f$ at the foot $d^1$ of the microscope carrier $d$, causes in the case of proper adjustment the light of an optional source of light to enter the microscope $e$ in the direction of the axis of the bolt $a^1$. In the focal plane of the eye piece of the microscope $e$ there is a fixed plate of glass $e^3$ and a plate of glass $e^5$ in the form of an annular disc which is mounted in a metallic diaphragh $e^6$ which is rotatable about an eccentric axis $e^4$ and which projects into the image field below the disc $e^3$. The diaphragm $e^6$ can easily be rotated by the fingers since its margin is accessible on one side. At the objective end $e^7$ of the microscope $e$ there is screwed on a little box $g$ (see Fig. 4) in which two semi-lenses $g^1$ may approach each other with their mounts in a carriage guide $g^2$ by the actuation of two micrometers $g^3$, whilst two springs $g^4$ strive to move the two semi-lenses in the opposite direction. In order to protect the sensitive parts, the little box $g$ is provided with a protecting glass $g^5$. Above the semi-lenses $g^1$ is disposed a lens $g^6$ which, owing to its sufficiently large diameter, is capable of receiving the ray pencils emerging from the semi-lenses in any position of the latter. The lens $g^6$ in connection with each of the two semi-lenses $g^1$ represents a microscope objective, these two objectives producing images of adjacent flanks of tooth of the wheel $b$, i. e. according to the adjustment of the toothed wheel $b$ relatively to the optical axis of the lens $g^6$ of both flanks of one tooth or of two adjacent flanks of adjacent teeth, which images overlap each other. The fixed plate $e^3$ carries a rectilinear mark which consists of a linear mark $h^1$, (see Fig. 6) indicating the centre of the image field $e^2$, and of a linear mark $h^2$ perpendicular thereto in a point A. (See Fig. 5.) The rotatable plate $e^5$, whose centre of rotation C lies in the extension of the linear mark $h^1$, is provided with a spiral linear mark $i$ which intersects the linear mark $h^1$ at a point B in the image field $e^2$. The images $k^1$ and $k^2$ of two adjacent flanks of tooth of a toothed wheel to be tested intersect at a point D of the image-field the point of a particularly dark area $k^3$ which arises at the place where the two parts of the tooth observed simultaneously cut off the light. The distance AB represents the play for the position of the point D, the rotatable, spiral mark $i$ acting like a mark displaceable in the radial direction.

In the modification shown in Fig. 6 the fixed plate $e^3$ carries, in addition to the rectilinear marks $h^1$ and $h^2$, a number of marks, formed each by a pair of straight lines inclined to each other. The bisecting line of the angles formed by each pair of lines is the linear mark $h^1$. One of these pairs of lines surrounds at any one time that particularly dark area $k^3$, simultaneously shaded by the two parts of the tooth observed.

In the modification shown in Fig. 7 the fixed divided plate $e^3$ carries the rectilinear marks $h^1$ and $h^2$, whilst on the rotatable divided plate $e^5$ a number of marks $m$ are disposed, each mark being formed by a pair of straight lines inclined to each other. The bisecting lines of the angles formed by each pair of lines would pass through the centre of rotation C and one each of these pairs of lines $m$ surrounds in the image field $e^2$ that particularly dark area $k^3$.

When testing toothed wheels the operation is as follows. The toothed wheel $b$ to be tested is provided with a bush $b^1$ and fixed on the bolt $a^1$ by means of the nut $a^2$. In accordance with the diameter of the toothed wheel the toothed wheel carrier $a$ must be tightened on the T-groove $c^1$ by means of the bolt screws $a^3$ and $a^4$ in such a way that the optical axis of the microscope $e$ intersects the toothing, and the mirror $f^1$ is to be so adjusted as to allow the light of an optional source of light, e. g. the daylight, to enter the microscope between the flanks of two adjacent teeth. After the focussing of the microscope $e$ by means of the coarse adjustment by the pin $d^3$ and the fine adjustment by the pinion $d^6$ the view through the microscope shows the images of two parts of the toothing which are produced in the image plane $e^2$ by the two semi-lenses $g^1$ conjointly with the lens $g^6$. Thereupon the microscope carrier $d$ is displaced in its carriage guide $d^2$ until a circle of a certain, definite radius, e. g. the pitch circle (see the circle $t$ in Fig. 15) of the toothed wheel to be tested, intersects the linear mark $h^1$, representing the centre of the image field $e^2$, at a certain, definite point, e. g. the point of intersection A of this linear mark (see Fig. 5) with the linear mark $h^2$, perpendicular thereto. By adjusting the micrometers $g^3$ to equal values and by rotating the toothed wheel $b$ until the two parts of the toothing intersect on the linear mark $h^1$ it can be attained that the imaged parts of the toothing, e. g. two adjacent flanks of tooth lie symmetrically to the optical axis of the microscope. It is now possible to symmetrically displace in the image field $e^2$ the two semi-lenses $g^1$ and therewith the images of the flanks $k^1$ and $k^2$ by simultaneously adjusting the two micrometers $g^3$ to other equal values, whereby the point of intersection D of the images of the flanks $k^1$ and $k^2$ travels on the linear mark $h^1$. If the micrometer adjustment be so chosen that the distance of the optical axes of the semi-lenses $g^1$, i. e. the total of the two equal micrometer-values corresponds to the circular pitch due to the two flanks observed (whereby the arc between the two points in question can be assumed to be equal to its chord) the point of intersection D of the two images of the flanks, provided the toothing is free from errors, should come to lie upon the point A. The generally existing deviation of the position of the point D from the point A represents the error of division of the toothing for the two flanks observed, the half of its value being indicated on each of the two micrometers $g^3$, if the same are rotated on an equal amount each, until the point D coincides with the point A. By so adjusting the plate $e^5$ by means of the milled head $e^6$ that the point of intersection B of the spiral $i$ with the linear mark $h^1$ corresponds to double the admissible error of the circular pitch, and by displacing the point of intersection of the pitch circle with the linear mark $h^1$ into the middle of the distance AB, AB represents the play, i. e. the range within which the points of intersection D of all pairs of flank images $k^1$ and $k^2$ must lie if in the pitch circle the deviations of the toothing from the correct value shall not exceed the admissible error. In that case the flanks of tooth in the range observed are assumed as approximately rectilinear and as coinciding each with those of their tangents which may be laid against the curve in the point of intersection of the flank with the pitch circle.

If the apparatus be constructed according to Fig. 6, one selects from the number of fixed angular marks the one mark $l$ which surrounds that particularly dark area $k^3$ simultaneously shaded by the two parts of the teeth imaged, and observes the position of the images $k^1$ and $k^2$ of the flanks relatively to this mark $l$. If the apparatus be constructed according to Fig. 7, one rotates the divided plate $e^5$ by means of the milled ring $e^6$ until the bisecting line of one of the marks $m$, surrounding the area $k^3$, coincides with the fixed linear mark $h^1$ in the image field $e^2$. By displacing the microscope carrier $d$ in its carriage guide $d^2$ it can be attained that one of the marks $l$ and $m$ respectively just comes in contact with the images $k^1$ and $k^2$ of a pair of flanks free from errors. If a tooth tested shows errors light gaps arise between the mark $l$ and $m$ respectively and the images $k^1$ and $k^2$. These light gaps may even be noticed if a deviation from the position of the point of intersection D cannot be ascertained owing to the uncertain position of this point of intersection and they compensate, so to speak, the excavations of the images of the flanks.

If it be desired not to test the toothing in the pitch circle but in an optional circle of a different diameter, it is only necessary to insert instead of the pitch circle the other circle and to use the thicknesses of tooth and the values of the space appertaining to this circle. In all cases it is possible to ascertain and measure errors which are due to inexact division as well as those which, with correct division, are due to incorrect thickness of tooth.

In the modification shown in Figs. 8 to 12 the fixed plate $e^3$ is provided with a mark consisting of two parts $h^1$ and $h^2$ perpendicular to each other, whereby the mark $h^1$ is replaced at the margin of the image field $e^2$ by a double line $h^3$. On the plate $e^5$ which is rotatable with the aid of the milled ring $e^6$ about its centre C there are distributed in groups over the periphery a spiral mark $i$, a number of angular marks $m$ and a number of rectilinear marks $n$, the latter inclined to each other and increasing gradually with regard to its distance from the axis of rotation C. If these marks $n$ be assumed to be extended towards the centre of rotation C, they come in contact with one each of a number of concentric circles $o$, assumed to be described about this point C, the diameter of these circles being graduated according to an arithmetic series. They represent therefore parallel lines with distances, increasing by an equal interval, with radial rays of the rotatable plate $e^5$, which rays, on their part, are indicated on the margin of the plate $e^5$ by short, numbered lines $n^1$. The images $k^1$ and $k^2$ of two flanks of different directions of a toothed wheel to be tested intersect at a point D of the image field, viz, the point of that particularly dark area $k^3$, simultaneously shaded by both parts of the tooth.

Figure 9:
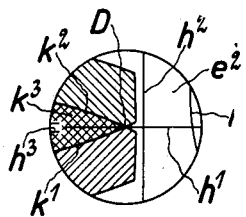
Figure 10:
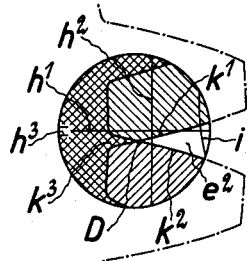

Any possible oblique position of the tooth can be ascertained as follows. The two micrometers $g^3$ are adjusted to equal values and the microscope $e$ is placed on its carriage guide $d^2$ in such a position that an image is produced as shown in Fig. 9. The point of intersection D of the two flanks of tooth $k^1$ and $k^2$ observed lies in that case near the addendum circle and coincides with the linear mark $h^1$. By now altering the position of the microscope in such a way as to displace the same towards the toothed wheel to be tested with a simultaneous outward adjustment of the two semi-lenses $g^1$ to again equal micrometer-values, the point of intersection of the flanks D approaches the root circle and should, with a straight position of the tooth, continuously coincide with the linear mark $h^1$. If, however, on the microscope being displaced, this point recedes more and more from the linear mark $h^1$ (as shown in Fig. 10), an oblique position of the tooth is thereby proved.

In order to be able to measure the magnitude of this error, the linear marks $n$ are to be brought in succession into the measuring position by means of rotating the milled ring $e^6$. This position is attained for each of the linear marks $n$ as soon as the appertaining radial ray coincides with the centre of the image field, i. e. as soon as the numbered, short line $n^1$ falls between the double line $h^3$ indicated at the margin of the image field. By correspondingly slight rotations of the toothed wheel to be tested the point of intersection of the flanks D is now brought into coincidence with the linear mark $n$ adjusted at any one time and the above described process of the displacement of this point D from the addendum circle towards the root circle or vice versa is repeated. The numbering of that line $n^1$ which appertains to that linear mark $n$, coinciding with the path traversed with such a process from the point D in the image field $e^2$, shows the magnitude of the error to be tested. Figs. 11 and 12 represent, e. g. for the line $n^1$ numbered "3" the case that the path of the point D coincides with the appertaining linear mark $n$, being in the measuring position.

In the example shown in Figs. 13 to 16 the ray pencils, appertaining to two points E and F of two adjacent flanks of tooth of the same direction of a toothed wheel $b$ to be tested traverse two uniform semi-lenses $p^1$ and $p^2$, by whose mount a semicircular cross section is imparted to them. The free working distance is in that case so chosen that the sharply focused surface of the toothed wheel $b$ lies in the front focal plane of the lenses $p^1$ and $p^2$. The image plane of the microscope, in which two divided plates $e^3$ and $e^5$ are fitted, lies therefore in the rear focal plane of a rear member $p^3$ towards which the pencils strive as parallel ray pencils. The two semi-lenses $p^1$ and $p^2$ (like the semi-lenses $g^1$ of the first constructional example) are assumed to be displaceable by means of two micrometers $g^3$ against a spring pressure. The vertical line dropped from the axis of rotation of the toothed wheel $b$ upon the path, described by the centres of the lenses with displaced micrometers, hits this path at a point G in which with the semi-lenses $p^1$, $p^2$ completely pushed together their centres coincide with each other. The pencil emerging from the point F experiences in two isosceles-rectangular reflecting prisms $q^2$ and $q^3$ a reflection each, whilst the pencil emerging from the point E is twice reflected in a pentagonal prism $q^1$ and transmitted to the reflecting prism $q^3$, where it undergoes a third reflection. The principal rays of the imaging pencils are therefore displaced parallelly to themselves between the semi-lenses $p^1$ and $p^2$ respectively and the rear member $p^3$ and, owing to the number of reflections differing by one, the one of the two images produced by the pencils in the image field $e^2$ appears mirror-reversed relatively to the other. According to the arrangement of the reflecting prisms the exchange of the sides takes place in the direction of motion of the two front lenses $p^1$ and $p^2$. For the observation of the images, produced in the image plane, of the two flanks serves an ocular consisting of a field lens $r^1$ and an eye lens $r^2$. The marks disposed on the plates $e^3$ and $e^5$ are assumed to correspond to the marks $h^1$, $h^2$ and $i$ shown in Fig. 5.

The testing process takes place as follows. The micrometers $q^3$ are adjusted to equal values, corresponding to half the circular pitch of the toothed wheel $b$ fitted to the apparatus, whereby the distance between the centres of the semi-lenses $p^1$ and $p^2$ becomes equal to the division in the pitch circle (the arc of a circle being assumed to approximately equal its chord). Then the microscope $e$ is brought by means of a displacement in its carriage guide $d^2$ into a position relatively to the toothed wheel $b$ to be tested, in which position the image of its divided circle $t$ comes in contact in the image field $e^2$ with the mark $h^2$ in its point of intersection with the mark $h^1$, bisecting the image field. Hereupon one rotates the toothed wheel $b$ about its axis until an image $s^1$ of a flank appears in the image field $e^2$, which hits in the pitch circle $t$ the point of intersection of the marks $h^1$ and $h^2$. With a circular pitch free from errors there will then appear in the image field $e^2$ a mirror-reversed image $s^3$ relatively to the image $s^1$ with respect to the mark $h^1$ of an adjacent flank $s^2$ of the same direction, which reversed image intersects the image $s^1$ at a point D, coinciding with the point of intersection of the marks $h^1$ and $h^2$, i. e. on the pitch circle. This point D forms the point of a particularly dark area $k^3$ (Fig. 15) which is simultaneously shaded by both teeth observed. If the division shows errors, the point D of the area $k^3$ coincides with a point of the image $s^1$, deviating from the pitch circle $t$. After having adjusted the admissible error of division with the aid of the spiral mark $i$ one is able to ascertain whether the error really existing exceeds the admissible limit. The above described testing process can be repeated for any circle about the centre of the wheel intersecting the toothing, whereby the circular pitch varies in proportion to the diameters of these circles relatively to the diameter of the pitch circle, whilst the angle of division remains unchanged. If the freedom from errors of the division on an optional circle has once been ascertained, there suffices the simple rotation of the toothed wheel $b$ during the observation with an optional adjustment of the micrometers to equal values in order to ascertain whether also on all the remaining circles the division of the pair of teeth just observed is free from errors. In this case the point of intersection D of the two images of the flanks $s^1$ and $s^3$ describes during the rotation a path in the image field $e^2$, which coincides with the mark $h^1$. If, however, the path of the point D deviates from the mark $h^1$ (Fig. 16), it is thereby proved that the angle of division for corresponding points of two adjacent flanks of the same direction is variable. In order to test the toothing on the whole periphery it is necessary to apply the above testing process for all adjacent pairs of teeth in succession.

We claim:

1. In an apparatus for testing the accuracy of toothed wheels a base plate, a microscope fitted on this base plate, the objective of which microscope including two parts displaceable relatively to each other for producing two images, overlapping each other in the image field of the microscope, of adjacent flanks, i. e. of both flanks of one tooth or of two adjacent flanks of adjacent teeth, the microscope furthermore including a transparent disc, fixed in the focal plane of the eyepiece of the microscope, and having a rectilinear mark visible together with the said two images and a transparent carrier rotatable about an axis parallel to the axis of the microscope to which axis of rotation said rectilinear mark is normal, said carrier being inscribed with a spiral mark, the carrier being adapted by its revolution to bring the parts of the spiral mark successively into the path of the rays traversing the microscope.

2. In an apparatus for testing the accuracy of toothed wheels a base plate, a microscope fitted on this base plate, the objective of which microscope including two parts displaceable relatively to each other for producing two images, overlapping each other in the image field of the microscope, of adjacent flanks, the microscope furthermore including a transparent disc fixed in the focal plane of the eyepiece of the microscope, and having a rectilinear mark visible together with the said two images and a transparent carrier rotatable about an axis parallel to the axis of the microscope to which axis of rotation said rectilinear mark is normal, said carrier being inscribed with a number of rectilinear marks inclined to each other and increasing gradually with regard to its distance from the axis of rotation of the carrier, the carrier being adapted by its revolution to bring the last named marks successively into the path of the rays traversing the microscope.

3. In an apparatus according to claim 2, the said transparent disc having further a number of angular marks lying symmetrically to the first-mentioned rectilinear mark, all these marks being visible together with the said two images.

4. In an apparatus for testing the accuracy of toothed wheels a base plate and a microscope fitted on this base plate, the objective of which microscope including two parts displaceable relatively to each other for producing two images, overlapping each other in the image field of the microscope, of adjacent flanks, and a mirror system presenting to the rays coming from one of the said two flanks one reflecting surface more than to the rays coming from the other flank, for making the one of the two images reversed in one direction with regard to the other image.

ADOLF STEINLE.
OTTO EPPENSTEIN.